Aug. 4, 1970
J. F. HOWELL
3,522,658
ELECTRICAL OUTLET BOX LOCATER
Filed May 22, 1968
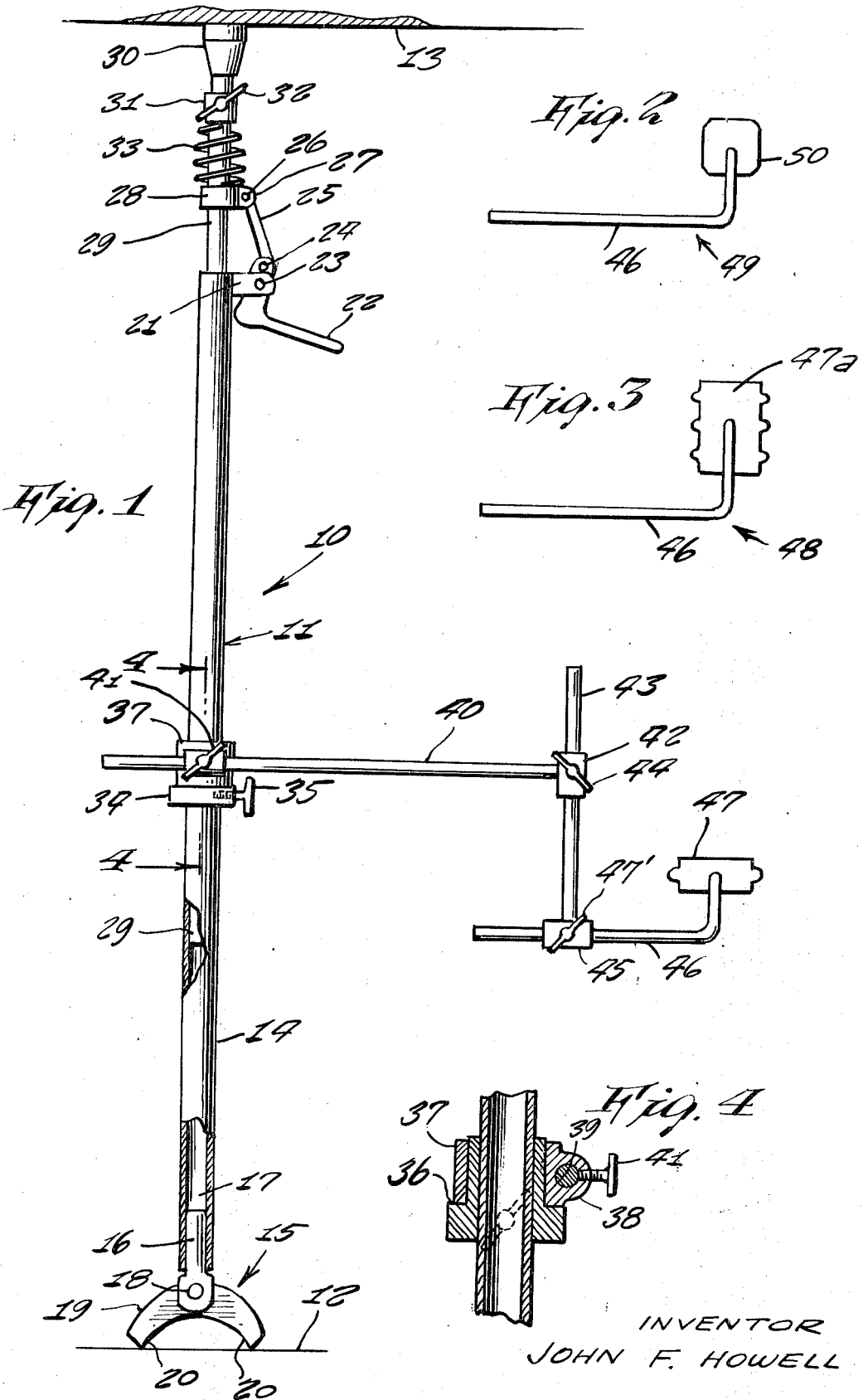
INVENTOR
JOHN F. HOWELL United States Patent Office 3,522,658
Patented Aug. 4, 1970

3,522,658
ELECTRICAL OUTLET BOX LOCATER
John F. Howell, Box 314, Robbinsville, N.C. 28771
Filed May 22, 1968, Ser. No. 731,129
Int. Cl. G01b 3/30
U.S. Cl. 33—180  4 Claims

ABSTRACT OF THE DISCLOSURE

A device for marking the exact place to cut openings in wall panels during wall construction, after the electrical outlet boxes have already been installed, a stationary stand which carries a template that is adjustable to the location of the electrical outlet box, the template being positioned adjacent the front side of the wall panel after the same has been installed over the electrical outlet box, thereby indicating the exact position of the outlet box behind the wall panel, the device including the stand which is securable between a floor and a ceiling of a room, the stand carrying a pivotable arm to which the template unit is secured.

This invention relates generally to interior wall construction tools. More specifically it relates to an electrical outlet box locater or indicator.

It is generally well known to those skilled in the art that during the erection of wall panels, it is difficult to define the exact location of electrical outlet boxes already installed, and accordingly openings through the wall panels are difficult to be properly positioned for being cut out.

Accordingly it is a principal object of the present invention to provide an electrical outlet box indicator for marking the exact position for cutting openings in wall panels which have to be placed on walls and ceilings after the electrical outlet boxes have already been installed.

Another object of the present invention is to provide an electric outlet box indicator which is readily adjustable to various ceiling heights.

Another object of the present invention is to provide an electrical outlet box indicator wherein the templates may be adjusted to any angle, horizontally or vertically and to any distance.

Other objects of the present invention are to provide an electrical outlet box indicator which is simple in design, inexpensive to manufacture, rugged in construction, easy to use and efficient in operation.

These and other objects will be readily evident upon a study of the following specification and the accompanying drawing wherein:

FIG. 1 is a side elevation view of the present invention shown partly in cross-section;

FIG. 2 is a side elevation view of one configuration of an electrical outlet box template;

FIG. 3 is a similar view of yet another configuration of an electrical outlet box template; and FIG. 4 is an enlarged cross-sectional view taken on the line 4—4 of FIG. 1.

Referring now to the drawing in detail, the reference numeral 10 represents an electrical outlet box indicator according to the present invention wherein there is a stationary stand 11 which is readily securable between a floor 12 and a ceiling 13 of a room.

The stand 11 includes an elongated pipe 14 which is securable at its lower end to a base 15. The base 15 includes a shank 16 receivable into the lower end 17 of the pipe 14, the shank 16 being pivotable about a pin 18 secured to a semi-circular shoe 19 having two spaced apart points 20 bearing against the upper side of the floor 12. The upper end of the pipe 14 is provided with a pair of sidewardly extending fulcrum legs 21 between which a lever 22 is pivotable about a pin 23 supported between the fulcrum legs 21. One end of the lever 22 carries a pin 24 to which one end of a link 25 is secured pivotally free, the opposite end of the link 25 being secured to a pin 26 supported upon an ear 27 of a collar 28 through which a longitudinally extending rod 29 extends, the rod 29 being receivable into the upper end of the pipe 14 and accordingly being slidable longitudinally therewithin.

A rubber bumper 30 is fitted over the upper end of the rod 29 so to provide a soft cushion against the ceiling 13 and prevent marring the same. A collar 31 is slidable along the rod 29, the collar having a wing set screw 32 for fixedly securing the collar upon a selected position of the rod 29 as desired. A compression coil spring 33 is fitted around the rod 29 and is located between the collars 31 of the rod 29 and the collar 28 that is connected to the unit including the pipe 14.

A collar 34 is securable at a selective elevation around the pipe 14 by means of a wing set screw 35, the collar having a shoulder 36 upon which the lower end of a rotatable collar 37 is supported. The collar 37 includes a lug 38 having a horizontal opening 39 therethrough for receiving a horizontal bar 40, the bar being secured in a preferred position within the lug by means of a wing set screw 41. The bar 40 has a sleeve 42 integrally secured at one end thereof, the sleeve having a central opening for receiving a bar 43 which is securable relative to the sleeve 42 by means of a wing set screw 44. A sleeve 45 integral with one end of the bar 43 has a central opening for receiving a bar 46 which is securable relative to the sleeve 45 by means of a wing set screw 47'. The bar 46 has a template 47 rigidly affixed to one end thereof, the template 47 being of a configuration to conform to one of the various electrical outlet boxes conventionally installed within walls and ceilings of houses or buildings. Thus as shown in FIG. 1 of the drawing, the template 47 is shaped for a single outlet box, whereas the template unit 48 shown in FIG. 3 of the drawing includes a bar 46 having a template 47a. The template 47a is for a multiple switch box. In FIG. 2 of the drawing, the template unit 49 includes bar 46 having template 50 integral with one end thereof, the template 50 being configurated for a conventional junction box.

In operative use, the stand 11 is first erected between a floor and ceiling and at about 12 inches away from a wall having an electrical outlet box already installed therein previous to installation of the wall panels. With the handle of the lever 22 in an upward position and the collar 31 loosely upon the rod 29, the bumper 30 is positioned adjacent the underside of the ceiling 13 after which the wing set screw 32 is locked and thereafter the handle of the lever 22 is pulled downwardly so as to cause the spring 33 to bear pressure against the floor and ceiling, thus rigidly securing the stand in a fixed position. The various wing set screws 35, 41, 44 and 47' are unlocked so to allow the template 47 to be aligned directly with the front side of the electrical outlet box after which the wing set screws are secured. The bar 40 is then rotated to bring the template 47 out of the way while a wall panel is installed over the outlet box, after which the template 47 is again returned by swinging the bar 40 so that the outline of the template 47 may be marked upon the front side of the wall panel. The bar 40 thereafter is again swung out of the way and the marked up wall panel is removed so that an opening may be cut in the marked out location. Thereafter the wall panel is installed and the opening is found to be located directly in front of the electrical outlet box.

I claim:
1. An electrical outlet box indicator comprising an elongated stand, means on each end of said stand for engaging opposing room surfaces when positioned thereagainst, means for resiliently urging the ends of said stand into locked operating position with the engaging means contacting opposing surfaces of a room in which an electrical outlet box is located, an arm assembly having at least first and second bars projecting outwardly from and adjustably supported by said stand but remaining freely pivotable about said stand in all positions of adjustment, means adjustably locking the first of said bars in an angular relationship to the second of said bars, and an electrical outlet box template carried on the projecting end of the second bar of said arm assembly, whereby said template may be adjustably positioned over said electrical outlet box, may be locked in adjusted position, and thereafter may be pivoted therefrom without disturbing the position of the elongated stand relative to the room surfaces or the adjustment of the arm assembly and template relative to the electrical outlet box.

2. The combination as set forth in claim 1 wherein said stand comprises a vertical pipe and wherein said room engaging means comprises at least a base secured to the lower end of said vertical pipe, said base including a shank receivable within said lower end of said vertical pipe, a shoe pivotally secured to said shank, and a pair of spaced points on said shoe for placement against one of the aforesaid opposing room surfaces.

3. The combination as set forth in claim 2 wherein said means for resiliently urging the ends of said stand into locked operating position comprises a rod supported by and extending coaxially of the upper end of said pipe, a pair of fulcrum legs secured to and extending sidewardly from an upper end of said pipe, a lever pivotally supported to said fulcrum legs, one end of said lever being pivotally connected to one end of a link, a first collar surrounding and supported by said rod, the opposite end of said link being pivotally connected to said first collar, a rubber bumper installed upon the upper end of said rod for engagement against the other of said opposing room surfaces, a second collar adjustably and slidably supported by said rod between said first collar and said rubber bumper, and a compression coil spring connected between said first and second collars.

4. The combination as set forth in claim 3, wherein said arm assembly further comprises a first collar securable by a set screw around said pipe, a second collar rotatably supported upon a shoulder of said first collar, said second collar having a horizontal opening receiving said first bar horizontally therethrough, said first bar having a vertically extending sleeve integral with one end thereof, said second bar extending vertically through the sleeve of said first bar and being adjustably locked thereto with a set screw, said second bar having a sleeve integral with one end thereof, a third bar received by the sleeve of said second bar and having said electrical outlet box template integral with one end thereof, and said third bar being adjustably secured relative to the first and second bars with a set screw supported by the sleeve of said second bar.

References Cited

UNITED STATES PATENTS

| | | | |
|---|---|---|---|
| 1,415,145 | 5/1922 | Carlson et al. | 211—123 |
| 2,431,100 | 11/1947 | Woods. | |
| 2,898,688 | 8/1959 | Cottar | 33—197 X |
| 2,962,281 | 11/1960 | Hodgson | 269—190 |
| 2,990,172 | 6/1961 | Gianotta | 269—116 |
| 3,110,506 | 11/1963 | O'Brien | 248—356 X |
| 3,203,104 | 8/1965 | Heathington | 33—197 X |

WILLIAM D. MARTIN, Jr., Primary Examiner

U.S. Cl. X.R.

33—161, 174, 197